(12) United States Patent
Arno

(10) Patent No.: US 6,905,663 B1
(45) Date of Patent: Jun. 14, 2005

(54) APPARATUS AND PROCESS FOR THE ABATEMENT OF SEMICONDUCTOR MANUFACTURING EFFLUENTS CONTAINING FLUORINE GAS

(76) Inventor: Jose I. Arno, 13 Twilight La., Brookfield, CT (US) 06804

( * ) Notice: Subject to any disclaimer, the term of this patent is extended or adjusted under 35 U.S.C. 154(b) by 0 days.

(21) Appl. No.: 09/551,279

(22) Filed: Apr. 18, 2000

(51) Int. Cl.⁷ .................................................. C01B 7/00
(52) U.S. Cl. .................................................. 423/240 R
(58) Field of Search ........................ 422/168, 171–172, 422/173; 423/210, 240 R

(56) References Cited

U.S. PATENT DOCUMENTS

| | | | |
|---|---|---|---|
| 3,813,852 A | 6/1974 | Steineke | 423/241 |
| 5,238,656 A | 8/1993 | Tajima et al. | 422/171 |
| 5,759,237 A | 6/1998 | Li et al. | 95/149 |
| 2001/0001652 A1 * | 5/2001 | Kanno et al. | 423/240 S |

FOREIGN PATENT DOCUMENTS

| | | |
|---|---|---|
| DE | 4319118 | 12/1994 |
| DE | 4321762 A1 | 1/1995 |
| EP | 0412456 A2 | 2/1991 |
| EP | 0885648 A1 | 12/1998 |
| EP | 1129775 A1 | 9/2001 |

OTHER PUBLICATIONS

Landau, R., Rosen, R., *Industr. Eng. Chem.*, 39, pp. 281–286 (1974).

Turnbull, S.G., Benning, A.F., Feldmann, G.W., Linch, A.L., McHarness, R.C., Richards, M.K., *Industr. Eng. Chem.*, 39, pp. 286–288 (1947).

Slabey, V.A., Fletcher, E.A., National Advisory Committee for Aeronautics, Technical Note 4374, 1958.

Smiley, et al. "Continuous Disposal of Fluorine", Industrial and Engineering Chemistry, 1954, vol. 46, No. 2, pp. 244–247.

Streng, A.G., "The Fluorine–Steam Flame and its Characteristics", Jun. 1962, pp. 89–71.

Langan, J., Maroulis, J., and Ridgewa, R., Solid State Technology, "Strategies for greenhouse gas reduction" Jul. (1996), 115.

J.T. Holmes et al., I&EC Process Design and Development, vol. 6, No. 4, p. 408, 413, (1967).

Cady, G.H.J.J. Am. Chem. Soc., 57, 246 (1935).

Smiley, S.H. and Schmitt, C.R. Ind. Eng. Chem., 46, p. 244 (1954).

Streng A.G. Combustion Flame, 6, p. 89 (1962).

* cited by examiner

*Primary Examiner*—Hien Tran

(57) ABSTRACT

Apparatus and process for the abatement of fluorine and fluorine-containing compounds from gases containing same, such as effluent gas streams from semiconductor manufacturing operations, wherein a fluorocompound abatement medium is injected into the fluorocompound-containing gas. The fluorocompound abatement medium comprises at least one of steam, methane and hydrogen, with the proviso that when the fluorocompound abatement medium contains methane and/or hydrogen, the injection of the fluorocompound abatement medium is conducted under non-combustion conditions.

20 Claims, 3 Drawing Sheets

APPARATUS AND PROCESS FOR THE ABATEMENT OF SEMICONDUCTOR MANUFACTURING EFFLUENTS CONTAINING FLUORINE GAS

BACKGROUND OF THE INVENTION

1. Field of the Invention

This invention relates to an apparatus and process for abatement of fluorine in gases containing same, as for example in effluent gas streams produced in semiconductor manufacturing operations.

2. Description of the Related Art

The trend of recent years in the semiconductor industry has been to optimize reactors that use perfluorinated compounds (PFCs), as an approach to minimizing the presence of PFCs in the effluents of such reactor systems.

Despite the pervasiveness of this approach, there is also emerging a renewed effort to resolve the problem of PFC emissions by treatment of effluent gas streams from such reactor systems, to remove high concentrations of fluorine gas and other fluorinated organic gases from the effluent gas streams that are discharged from the reactor or other process tool.

In December 1997, over 160 countries of the world negotiated the Kyoto Climate Protection Protocol. This global agreement is intended to encourage immediate efforts to reduce the emission of greenhouse gases. Perfluorinated gases and sulfur hexafluoride ($SF_6$) were listed among the six gases specifically targeted under the protocol. These fluorine (F) saturated species are among the strongest greenhouse gases, with global warming potentials (GWPs) 3 and 4 orders of magnitude higher than $CO_2$. Moreover, they are extremely stable molecules with lifetimes in the atmosphere of thousands of years.

The electronics industry uses PFCs in a number of plasma processes to generate highly reactive $F_2$ and fluorine radicals. These in situ generated species are produced to remove residue from tools or to etch thin films. The most commonly used PFCs include $CF_4$, $C_2F_6$, $SF_6$, $C_3F_8$, and $NF_3$. Chamber cleans after chemical vapor deposition (CVD) processes account for 60–95 % of PFC use (Langan, J., Maroulis, J., and Ridgeway, R. *Solid State Technology* July, 115 (1996)).

Ongoing research to reduce PFC emission levels falls into four categories: optimization, alternative chemicals, recovery/recycle, and abatement. Process optimization was recognized by industry leaders as the preferred choice to reduce PFC emissions; abatement fell last on that list.

Process optimization involves adjusting the operating conditions in the reactor to achieve enhanced PFC conversion within the tool. Existing non-optimized conditions result in PFC utilization that vary depending on the specific gas and process used. For instance, oxide etch using a combination of $CF_4$ and $CHF_3$ ranks lowest with 15% efficiency. Tungsten deposition processes are reported to utilize up to 68% of $NF_3$. Recent developments in optimized plasma clean technologies were proven to provide up to 99% $NF_3$ utilization within the tool (*Proceedings of the Global Semiconductor Industry Conference on Perfluorocarbon Emissions Control*, Monterey, Calif. Apr. 7 and 8, 1998).

High PFC conversions result inevitably in the formation of hazardous air pollutants (HAPs). Breakdown products include mostly fluorine ($F_2$) and silicon tetrafluoride ($SiF_4$) gases and to a lesser extent HF and $COF_2$. Destruction of fully fluorinated gases generates considerably augmented HAP yields compared to the initial PFC volumes delivered to the tool. For instance, assuming stoichiometric conversion of PFCs into $F_2$, a 1 liter per minute (lpm) flow rate of $NF_3$ could potentially produce 1.5 lpm of $F_2$. The combined exhaust stream of four chambers could potentially generate up to 6 lpm of fluorine gas resulting in a post-pump effluent concentration of 3% $F_2$ (50 lpm ballast $N_2$ per pump). These estimated values double with hexafluorinated PFCs (compared to $NF_3$) and are likely to increase in the future with the projected throughputs of 300 mm wafer manufacturing.

The toxic and corrosive nature of fluorinated HAPs pose considerable health and environmental hazards in addition to jeopardizing the integrity of exhaust systems. In particular, the oxidizing power of $F_2$ is unmatched by any other compound and is far more reactive than other halogens. The large volumes $F_2$ and other fluorinated hazardous inorganic gases released during optimized plasma processing require the use of (POU) abatement devices in order to minimize potential dangers and to prolong tool operation. Out of all fluorinated inorganic gases, fluorine gas, $F_2$, poses the higher challenge for its abatement and the ensuing description addresses existing alternatives for its abatement.

Current fluorine abatement alternatives include dilution, dry, thermal and wet techniques.

In dilution treatment, non-reactive gases are added to lower the concentration of fluorine and other hazardous materials in the effluent stream being treated.

At high concentrations, fluorine reacts exothermically with all elements except $O_2$, $N_2$, and noble gases. Consequently, a reasonable approach to $F_2$ abatement is to remove this highly active gas using naturally occurring reactions without adding energy to the system.

In the dry abatement methods for $F_2$ removal, the fluorine gas stream is flowed through a dry bed filled with a reactive material. Alumina has been used in the past for this purpose (J. T. Holmes et al *I&EC Process Design and Development*. Vol 6. No. 411 (1967) In this approach, suitable dry chemicals convert $F_2$ into innocuous solids or benign gases without generating excessive heat, an important condition since heat generation can be a limiting factor especially if the dry chemical bed is exposed to large volumes of $F_2$.

Thermal abatement approaches combine reactive materials and $F_2$ inside a reactor that is heated using fuel or electrical energy. Existing thermal units require the addition of hydrogen source/fuels such as methane or hydrogen to drive the fluorine reaction to completion, converting fluorine into HF. Users do not desire adding such gases since they thereby increase hazard risk and cost of ownership of the abatement system. Further, the by-products generated by the thermal abatement of $F_2$ typically include hot acids that in turn require the use of a post-treatment water scrubber. The removal efficiencies in these scrubbers are often compromised due to the fact that the scrubbing efficiency of most acid gases decreases as a function of increasing temperature. In addition, containment of hot concentrated acids requires expensive materials of construction to prevent temperature-enhanced corrosive attack on lines, vessels and fittings.

In wet abatement methods, the fluorine is reacted with $H_2O$. The main products of the reaction between water and $F_2$ are HF, $O_2$, and $H_2O_2$. (Cady, G. H. J. *J. Am. Chem. Soc.* 57, 246 (1935). Objections to using water scrubbers include concerns over the formation of unwanted $OF_2$, and the large water consumption necessary to achieve acceptable removal efficiencies at high fluorine challenges.

It therefore is apparent that all of the conventionally employed approaches to abating fluorine in effluent gas streams have associated deficiencies, which limit their commercial viability and amenability to economic and practical use.

It correspondingly is an object of the present invention to provide an improved apparatus and method for the removal of fluorine and fluorine-containing gaseous compounds from gases containing same.

It is another object of the invention to provide an improved apparatus and method of such type that is adaptable to implementation for the treatment of effluent gas streams from semiconductor manufacturing operations.

Other objects and advantages of the invention will be more fully apparent from the ensuing disclosure and appended claims.

SUMMARY OF THE INVENTION

The present invention relates to an apparatus and method for abating gaseous fluorocompounds (such term being us herein to include gaseous fluorine and or other fluorine-containing gaseous compounds, e.g., $F_2$ and fluorine radicals, from gases containing such fluorocompounds.

In one aspect, the present invention relates to a process for abatement of gaseous fluorocompounds in a gas containing same. Such process comprises injecting a fluorocompound abatement medium into the fluorocompound-containing gas, wherein the fluorocompound abatement medium comprises at least one of steam, methane and hydrogen, optionally in further combination with a catalyst effective to enhance the abatement, with the proviso that when the fluorocompound abatement medium contains methane and/or hydrogen, the injection of the fluorocompound abatement medium is conducted under non-combustion conditions.

In another aspect, the invention relates to a process for abatement of gaseous fluorocompounds in a gas containing same, said process comprising injecting a fluorocompound abatement medium into the fluorocompound-containing gas, wherein the fluorocompounds abatement medium comprises at least one hydrocarbon gas and the injection of the fluorocompound abatement medium is conducted under non-combustion conditions.

A further aspect of the invention relates to a steam injection fluorocompound abatement apparatus comprising:

an elongate flow passage member adapted for introduction of fluorocompound-containing gas thereto at a first end thereof for flow through the flow passage member to a second discharge end thereof;

a heat source for heating the fluorocompound-containing gas during flow through the elongate flow passage member to a reaction zone at an intermediate portion of the elongate flow passage member between its first and second ends; and a steam source arranged to inject steam into the reaction zone of the elongate flow passage member.

Other aspects, features and embodiments of the invention will be more fully apparent from the ensuing disclosure and appended claims.

DETAILED DESCRIPTION OF THE INVENTION, AND PREFERRED EMBODIMENTS THEREOF

The present invention relates to the discovery that injection of steam, hydrogen, and methane may be efficiently and advantageously used to abate fluorine and fluorine-containing compounds from gases containing same.

Steam injection has been employed in prior efforts to treat gas streams. An apparatus built by E.I. du Pont de Nemours, Inc. to abate fluorine gas in chemical process plants was described in 1954 (Smiley, S. H. and Schmitt, C. R. *Ind. Eng. Chem.*, 46, pg 244 (1954)) and in a follow-up paper in 1962 (Streng A. G. *Combustion Flame*, 6, pg 89 (1962)). The present invention is a departure from this prior work, and utilizes steam injection based on the specific requirements and conditions of point-of-use abatement of fluorine and fluorine-containing gases in semiconductor effluent streams.

Under certain conditions, steam reacts with a preheated flow containing fluorine gas to form HF, with the extent of the reaction being highly dependent on the initial concentration of fluorine in the fluorine gas stream, the gas temperature, and the volume of steam injected.

Figure 1:
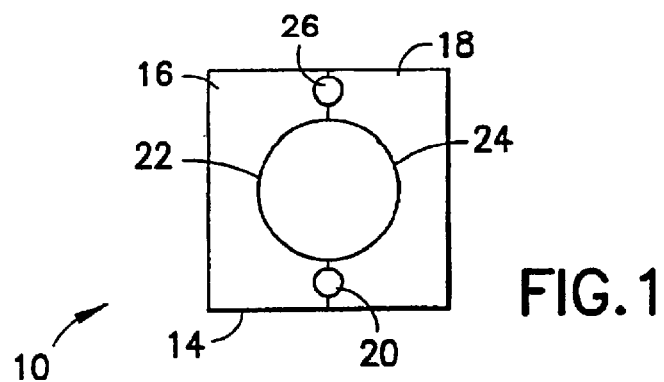
FIG. 1 is a top plan view of an apparatus for steam injection abatement of fluorine according to one embodiment of the invention.
Figure 2:
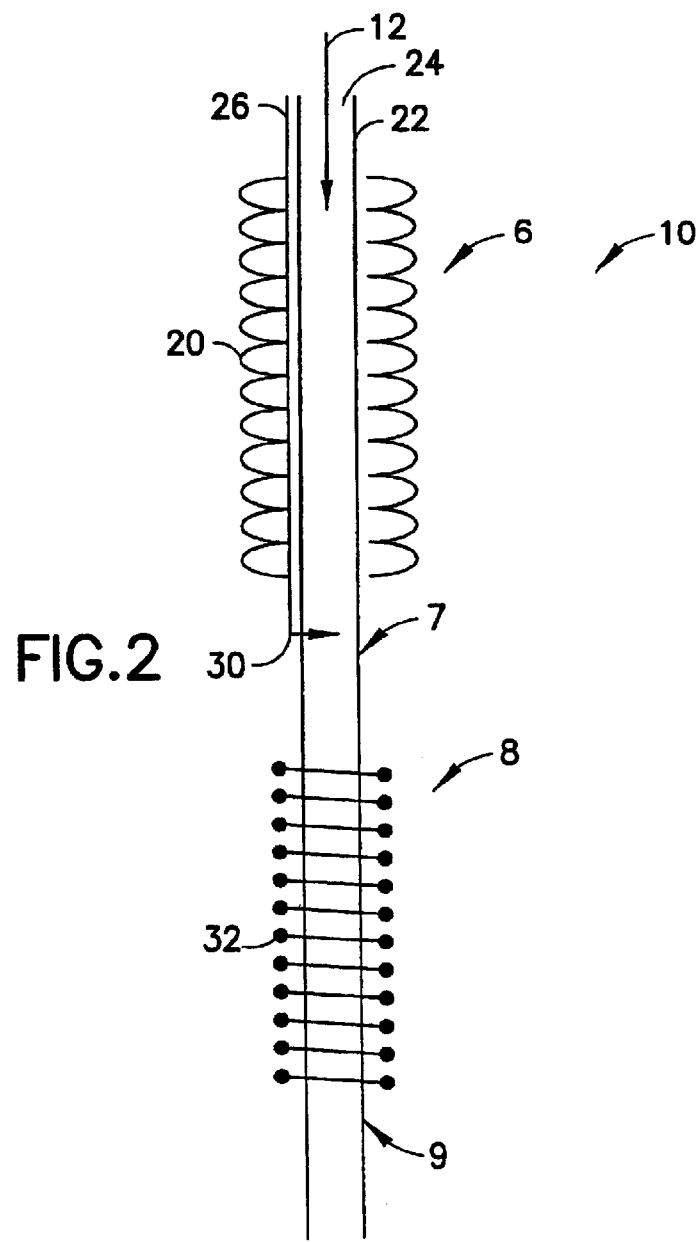
FIG. 2 is a side elevation view of the apparatus FIG. 1.

FIG. 1 is a top plan view and FIG. 2 is a side elevation view of a schematically rendered steam injection apparatus 10 according to one embodiment of the invention, for abatement of fluorine gaseous constituent(s) in a gas stream 12 containing such constituent(s).

Referring now to FIG. 1, the system consists of a gas preheating stage 6, in which the fluorine-containing gas 12 is flowed into the gas flow passage 24 bounded by passage wall 22 in aluminum block 14. The aluminum block 14 is formed in two half-sections 16 and 18.

Each of the half sections has respective channels therein that upon mating of the half-sections forms a first through-bore for passage of a water line 26 therethrough, and a second throughbore for installation of a cartridge heater 20 therein. The aluminum block 14 therefore forms an assembly that is readily assembled and disassembled, by use of suitable means (not shown in FIGS. 1 and 2) for disengageably engaging the respective half-sections to one another. Such means may for example comprise mechanical fasteners, hinges, clasps, set screws, keying or lock structures, integrally formed connectors on each half-section, etc.

The pre-heat stage 6 thus includes an extended length flow path through which the gas stream flows to the reaction stage 7 of the apparatus, while the water line 26 carries water from a suitable source (not shown) for heating by the cartridge heater 20 to generate steam.

The thus-generated steam then is introduced to the gas flow passage 24 at steam entrance 30, at an intermediate section of the passage. The steam then mixes and reacts with the fluorine constituent(s) of the gas stream.

The heat of the reaction then is dissipated by heat exchange cooling coils 32 helically circumscribing the cooling stage 8 portion of the passage 24. The gas stream during its flow through the passage is cooled to a suitable discharge temperature and exhausted from the passage at the exhaust 9.

The optional cooling stage 8 functions to quench the gas stream to suitable temperature after the reaction. Pre-heating the gas stream for the steam reaction can be accomplished in a number of ways, such as using the cartridge heater/metal block combination illustratively shown, or by any other suitable means.

Steam can be generated using the same heating source used to increase the temperature of the gas stream or using an independent steam generator. The quench region may be desirable if the effluent gases are delivered into an additional scrubbing system requiring the stream to be cooled.

The following Table 1 summarizes experimental results injecting superheated steam (300 F, 60 psig) to a varying concentration of a heated stream containing fluorine gas. These results were generated by delivering the steam into the oxidizer of an EcoCVD™ electrothermal oxidizer abatement device, commercially available from ATMI Ecosys Corporation, San Jose, Calif. Table 1 below summarizes results for the abatement (destruction and removal efficiency, % DRE) of $F_2$.

TABLE 1

$F_2$ abatement injecting steam into the oxidizer of the EcoCVD ™ Unit

| Tot Proc N2 slpm | Tot F2 in slpm | F2 inlet (ppm) | HF Out (ppm) | F2 Out (ppm) | F2 % DRE |
|---|---|---|---|---|---|
| 220 | 2.5 | 11364 | 252 | 1041 | 90.84 |
| 190 | 2.5 | 13158 | 365 | 694 | 94.72 |
| 130 | 2.5 | 19231 | 379 | 128 | 99.34 |
| 130 | 3 | 23077 | 533 | 128 | 99.44 |
| 130 | 4 | 30769 | 462 | 67 | 99.78 |

Table 1 shows the DRE levels for $F_2$ to be at least 90% in all runs.

It is to be recognized that steam injection can be used in combination with a catalyst to enhance the destruction efficiency of the fluorine gas and fluorine-containing gaseous constituents of the gas stream. Such catalysts can include (among others) metals, spark generating devices, glow plugs, hydrogen, ammonia, hydrogen peroxide, reducing agents, bases, or any catalytically active organic compounds.

1. The fluorocompound abatement process of the invention may be carried out at any suitable process conditions, with the proviso that when hydrocarbon gases (e.g., methane) and/or hydrogen are used as the fluorocompound abatement medium, such abatement conditions do not encompass or mediate combustion of the fluorocompound abatement medium. The choice of appropriate process conditions will depend on the specific fluorocompound abatement medium employed, and may be readily determined within the skill of the art, without undue experimentation. For example, such non-combustion abatement conditions may include a temperature in the range of from about 120 to 300° F.

Experimental results have demonstrated that steam doped with a 1:36 volume ratio between isopropyl alcohol (an organic compound) and water abated 2.5 standard cubic centimeters per minute (sccm) 2.5 slpm $F_2$ in 220 slpm $N_2$ to less than 1 ppm. In general, the concentration of catalyst is desirably in the range of 2 to 15% by volume, based on the volume of water (at standard temperature and pressure conditions of 25° C. and 1 atmosphere pressure, respectively), and more preferably in the range of from about 2.5 to about 7% by volume, based on the volume of water.

The foregoing results show that the use of steam in combination with an aqueous alkanolic solution is highly efficacious to reduce the fluorine content of the effluent gas stream containing fluorine or other gaseous fluorine-containing compounds.

Methane injection is another methodology that may be employed in the practice of the invention to abate fluorine constituents of effluent gas streams containing same.

The methane may be injected into a heated zone to abate a stream of fluorine gas, or the fluorine or fluorine-containing gaseous compounds of a gas steam containing same. Existing methods of abatement which utilize methane to generate heat (via combustion with oxygen or air), utilize 50 times the volume of methane used in a representative embodiment of the present invention. In accordance with this aspect of the invention, methane behaves solely as a reaction catalyst while heat is produced using electrical means (not combustion). This distinction is an important one, inasmuch as the cost of methane compared to prior art methane combustion systems is reduced by fifty times in the aforementioned representative embodiment.

Figure 3:
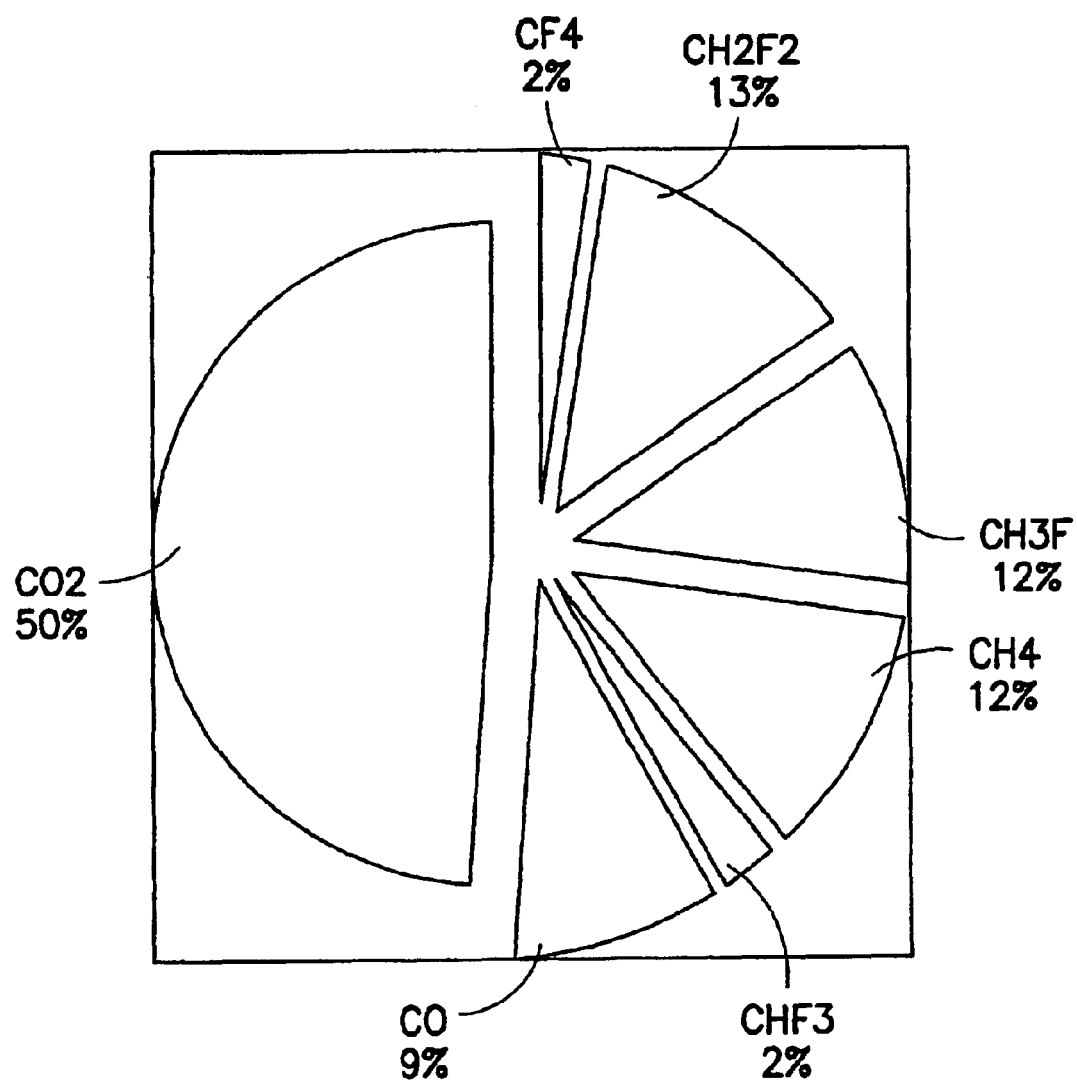
FIG. 3 is a graphical representation of the product distribution for the reaction between methane and fluorine gas.

Experimental results involving 3 standard liter per minute (slpm) 3 slpm $F_2$ in 220 slpm $N_2$ in a 1650° F. reactor required 1.2 slpm of methane to achieve complete $F_2$ destruction. The chart in FIG. 3 illustrates the reaction by-products generated by the reaction between methane and fluorine gas: 50% $CO_2$, 2% $CF_4$, 13% $CH_2F_2$, 12% $CH_3F$, 12% $CH_4$, 2% $CHF_3$ and 9%CO, wherein all percentages are by weight, based on the total weight of the reaction products. Out of 850 sccm $CH_4$ introduced to the $F_2$ abatement system, only 12 sccm of $CF_4$ were formed. These results show the efficacy of the invention involving the mixing and reaction of methane and fluorine gas with one another under non-combustion conditions. In the practice of this aspect of the invention, the appropriate proportions of the methane and fluorine constituents of the reaction mixture are readily determinable without undue experimentation, by stoichiometric and thermodynamic analysis for the specific gas composition being treated in the abatement process of the invention.

It therefore is to be recognized that, while the described invention was successful in destroying fluorine using methane, small volumes of other organic species (other than methane) would behave similarly. These organic species could include other hydrocarbon gases (ethane, propane, butane, etc.) in addition to organic liquids, and solid organic sources. In general, however, because of cost and "cleanliness" of the reaction involved, methane is highly preferred.

Hydrogen injection may be employed in another aspect of the invention for the abatement of fluorine and fluorine-containing gas components in a gas composition containing same.

Figure 4:
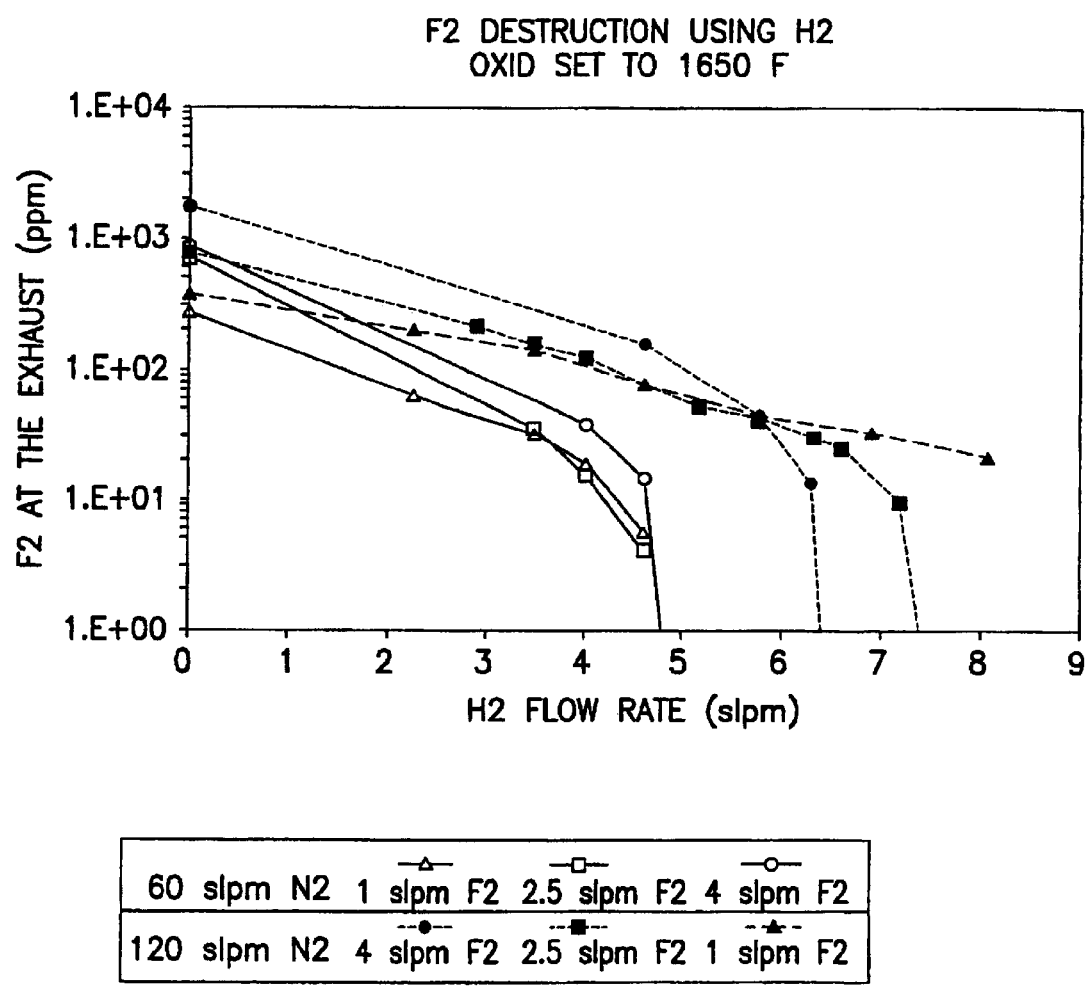
FIG. 4 is a graph of fluorine destruction as measured by effluent fluorine concentration, in ppm, at the exhaust of the treatment facility, as a function of hydrogen flow rate, in standard liters per minute.

This aspect of the present invention involves the injection of hydrogen to a heated reactor to convert fluorine to hydrogen fluoride. This method has the advantage over the use of methane, in that it does not generate organic fluorinated species. The volume of $H_2$ introduced is highly dependent on the overall gas flow rate of the stream to be abated and fluorine content within the stream. FIG. 4 demonstrates the volume of hydrogen necessary to achieve complete $F_2$ destruction. These results were generated using hydrogen injection in the oxidizer of an EcoCVD™ electrothermal oxidation system, challenged with 160 or 220 slpm $N_2$ mixed with 1, 2.5, and 4 slpm $F_2$.

In the injection of hydrogen gas for the abatement of the fluorine and/or fluorine-containing components of a process gas composition, the hydrogen is reacted with the fluorine components under non-combustion conditions, as again may he readily determinable within the skill of the art without undue experimentation, by the expedient of stoichiometric and thermodynamic analysis, and routine experimentation.

The results of FIG. 4 indicate that more hydrogen is required when the initial challenge contains less fluorine gas, and at lower residence times (higher overall flow rates). In nearly all cases, complete destruction was achieved when using between 5 and 8 slpm of hydrogen gas.

It should be recognized that hydrogen can be either provided from an external source or generated in-situ using hydrogen generating sources such as an electrolytic hydrogen generator, or a chemical generator of hydrogen.

The present invention thus provides a simple and effective approach to the problem of $F_2$ and fluorine-containing compounds reduction in gas streams or gas volumes containing same. The approaches that may be employed are: addition to the fluorine-containing gas of methane, wherein the methane is used to abate the fluorine-containing gas or to form certain perfluoro compounds, low flow introduction of hydrogen to the fluorine-containing gas, under non-combustion conditions: contacting the fluorine-containing gas with alternative atomic hydrogen sources; contacting the fluorine-containing gas with steam in the presence of a chemical "catalyst" (any of a variety of species): injection of a "chemical catalyst:" and the use of oxidation catalyst oxidize the fluorine content of the gas.

The methods of the present invention in addition to abating fluorine components of the gas containing same, are also able to abate pyrophorics and flammable constituents in the gas when present therein. Examples of such pyrophoric, flammable constituents include silanes, phosphine, etc.

The apparatus and method of the present invention thus provide multiple approaches for the abatement of fluorine gas from gas streams containing same.

The preferred abatement media of the present invention are steam, hydrogen and methane. These injected agents may be used singly or in combinations, or in single treatment fashion followed by combinatorial treatment (e.g., by initial steam injection, followed by combined hydrogen and methane injection at a downstream site from the steam injection locus in the flow path of the gas stream).

Further, while the invention is preferred to be employed in the abatement of fluorine and gaseous fluorine-containing gaseous species in a gas stream containing same, the gas treatment may be directed to a static volume of gas, so that the treatment is carried out in batch or semi-batch fashion.

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art. The invention therefore is to be broadly construed, consistent with the claims hereafter set forth.

What is claimed is:

1. A method of abating fluorine from a fluorocompound-containing gas, said method comprising:
   heating the fluorocompound-containing gas to temperature in a range of from about 120° F. and about 300° F.; and
   introducing a catalyst and a fluorocompound abatement medium into the fluorocompound-containing gas to abate fluorine from the fluorocompound-containing gas,
   wherein the fluorocompound abatement medium comprises at least one medium selected from the group consisting of superheated steam, methane and hydrogen, with the provisos that when the fluorocompound abatement medium comprises superheated steam, the concentration of fluorine in the fluorocompound-containing gas is in a range of from about 1.1 vol. % to about 3.1 vol. %, based on the total volume of the fluorocompound-containing gas, and when the fluorocompound abatement medium comprises methane or hydrogen, fluorine is abated from the fluorocompound-containing gas under non-combustion conditions.

2. The method of claim 1, wherein the fluorocompound-containing gas comprises a fluorine-containing gas selected from the group consisting of $F_2$ and fluorine radicals.

3. The method of claim 1, wherein the fluorocompound abatement medium comprises superheated steam.

4. The method of claim 1, wherein the fluorocompound abatement medium comprises methane.

5. The method of claim 1, wherein the fluorocompound abatement medium comprises hydrogen.

6. The method of claim 1, wherein the fluorocompound abatement medium comprises superheated steam, methane and hydrogen.

7. The method of claim 1, wherein the catalyst is selected from the group consisting of metals, ammonia, hydrogen peroxide, reducing agents, bases, and catalytically active organic compounds.

8. The method of claim 1, wherein the catalyst is an alkanol.

9. The method of claim 1, wherein the catalyst comprises isopropyl alcohol.

10. The method of claim 9, wherein the fluorocompound abatement medium comprises superheated steam.

11. The method of claim 1, wherein the fluorocompound abatement medium comprises superheated steam and the catalyst is employed at a concentration of from about 2 to about 15% by volume, based on a volume of water in the fluorocompound abatement medium.

12. The method of claim 1, wherein the fluorocompound abatement medium comprises superheated steam, and the catalyst is employed at a concentration of from about 2.5 to about 7% by volume, based on a volume of water in the fluorocompound abatement medium.

13. The method of claim 1, wherein the fluorocompound-containing gas comprises effluent from a semiconductor manufacturing facility.

14. The method of claim 1, wherein the abatement of fluorocompound-containing gases is conducted in an oxidizer zone of an effluent treatment facility comprising said oxidizer zone.

15. The method of claim 1, wherein the fluorocompound abatement medium is heated before it is introduced into the fluorocompound-containing gas, wherein the fluorocompound abatement medium is hydrogen or methane.

16. The method of claim 1, further comprising cooling formed reaction products after the fluorocompound-containing gas reacts with the fluorocompound abatement medium.

17. The method of claim 5, wherein the ratio of hydrogen to fluorocompound-containing gas is about 1:1 to about 8:1.

18. The method of claim 1, wherein the pressure of the superheated steam is about 60 psig.

19. A method of abating fluorine from a fluorocompound-containing gas, said method comprising:
   heating the fluorocompound-containing gas to temperature in a range of from about 120° F. and about 300° F.; and
   injecting a fluorocompound abatement medium including at least one hydrocarbon gas into the fluorocompound-containing gas, wherein fluorine is abated from the fluorocompound-containing gas under non-combustion conditions.

20. A method of abating fluorine from a fluorocompound-containing gas, said method comprising;
   heating the fluorocompound-containing gas to temperature in a range of from about 120° F. and about 300° F.; and
   introducing a fluorocompound abatement medium comprising steam and at least one of methane and hydrogen, and optionally a catalyst, into the fluorocompound-containing gas, wherein the fluorine is abated from the fluorocompound-containing gas under non-combustion conditions.

* * * * *